United States Patent
Guerin et al.

(10) Patent No.: US 11,623,681 B2
(45) Date of Patent: Apr. 11, 2023

(54) METHOD FOR FIXING A COVER ON AN ORIFICE OF A POWER STEERING SYSTEM

(71) Applicant: JTEKT EUROPE, Irigny (FR)

(72) Inventors: Mickael Guerin, Brindas (FR); Sylvain Grosso, Lyons (FR)

(73) Assignee: JTEKT EUROPE, Irigny (FR)

( * ) Notice: Subject to any disclaimer, the term of this patent is extended or adjusted under 35 U.S.C. 154(b) by 263 days.

(21) Appl. No.: 16/882,886

(22) Filed: May 26, 2020

(65) Prior Publication Data

US 2020/0369313 A1 Nov. 26, 2020

(30) Foreign Application Priority Data

May 23, 2019 (FR) ...................................... 1905425

(51) Int. Cl.
*B62D 5/04* (2006.01)
(52) U.S. Cl.
CPC ...................................... *B62D 5/04* (2013.01)
(58) Field of Classification Search
CPC .................................. B62D 5/004; B62D 3/02
See application file for complete search history.

(56) References Cited

U.S. PATENT DOCUMENTS

| 2013/0180794 A1* | 7/2013 | Shiino ................... | B62D 5/0409 |
| | | | 180/444 |
| 2015/0003901 A1* | 1/2015 | Yamaguchi .............. | B62D 1/20 |
| | | | 403/288 |
| 2015/0217798 A1* | 8/2015 | Anma ...................... | B62D 3/12 |
| | | | 180/443 |

FOREIGN PATENT DOCUMENTS

| DE | 102013013682 A1 * | 2/2014 | .............. B62D 3/12 |
| FR | 2989754 A1 * | 10/2013 | .............. F16C 23/10 |
| JP | 2009-118601 A | 5/2009 | |
| JP | 2011-021725 A | 2/2011 | |
| WO | WO-2005085039 A1 * | 9/2005 | .............. B62D 3/123 |

OTHER PUBLICATIONS

May 23, 2019 Written opinion issued in French Patent Application No. 1905425.

* cited by examiner

*Primary Examiner* — Jacob D Knutson
(74) *Attorney, Agent, or Firm* — Oliff PLC

(57) ABSTRACT

A method for fixing a cover on an orifice of a power steering system including a step of approaching the cover to the orifice, characterized in that it includes a step of inserting at least one extension of the cover in at least one recess positioned next to the orifice and a step of deforming the at least one elongation of the cover.

10 Claims, 4 Drawing Sheets

METHOD FOR FIXING A COVER ON AN ORIFICE OF A POWER STEERING SYSTEM

The invention concerns the field of housings of power steering systems of motor vehicles, and more specifically, a cover of an orifice of said housing as well as a method for fixing the cover on the orifice.

Motor vehicles include a steering system provided with a steering wheel driving a steering column. Said steering column is connected to a steering box comprising a rack extending along an axis transverse to an elongation axis of the vehicle. The rack allows carrying out a pivoting of the steered wheels of the vehicle.

A power steering system also includes an assistance device delivering on the rack an assistance force dependent on that given by the driver on the steering wheel. In this way, the required force of the driver to pivot the steering wheel is reduced.

One type of known electrical assistance device includes an electric motor connected to a housing 1, as represented in FIG. 1, comprising a reduction wheel and a worm screw, which drive a toothed wheel fixed on a shaft connected to a pinion of the rack.

Such a housing 1 generally comprises one or more access orifices 2, 3, 4 which pass through an outer wall 5 of said housing to allow an introduction and an assembly of all or part of the elements of the housing 1.

These access orifices 2, 3, 4 must be closed by means of a cover 6 provided with an O-ring 7 for example, so as to prevent an intrusion of liquid or foreign bodies, such as gravel, dust, in the housing 1, and thus guarantee the long-term correct operation of the elements protected by the housing 1.

Thereafter, we will focus more specifically on the cover 6 located on the reduction wheel of the housing 1. However, the invention can be applied to any other cover of the power steering system.

The cover 6 is fixed on the housing 1 by two self-shaping screws 8, that is to say a screw creating a screw pitch in the housing 1 during its insertion. The drawback of using such self-shaping screws 8 is to constitute elements independent of the cover 6. Thus, the self-shaping screws 8 must be supplied under a specific reference, there is a keying management relative to other screws in order to use the appropriate self-shaping screws 8, and it happens that a self-shaping screw 8 falls and is lost during the placing of the cover 6.

Furthermore, another drawback of the use of such self-shaping screws 8 is to define and control a torque of tightening said self-shaping screws 8. Indeed, during the insertion of the self-shaping screws, forces transverse to an axis of insertion of the screws are created in the cover, which can cause degradation of said cover. The presence of these transverse forces causes a constraint limiting the choice of material used to make the cover 6.

The material of the cover 6 must indeed have sufficient mechanical characteristics to withstand said transverse forces.

It is known to produce the cover 6 of housing 1 located on the reduction wheel in a material comprising a cyclic polyamide 6.6 loaded with 50% glass fibers (PA66-GF50)

The drawback of this material is that it is deformed when it is in a humid environment. Thus, when the motor vehicle is used, the cover, which is subjected to a hot and humid environment, is deformed until it takes the form of a hyperbolic paraboloid. This deformation can go so far as to make the O-ring 7 visible and cause a loss of sealing.

The object of the invention is to remedy all or part of the aforementioned drawbacks by proposing a method for fixing a cover on an orifice of a power steering system comprising a step of approaching the cover to the orifice, characterized in that it includes a step of inserting at least one extension of the cover into at least one recess positioned next to the orifice and a step of deforming the at least one extension of the cover.

During the approach step, the cover is placed facing the orifice.

During the insertion step, at least one extension of the cover is introduced into a recess. Said recess is independent of the orifice and it is positioned next to it. Said recess is a through recess.

The deformation step makes it possible to fix the cover on the orifice by blocking a portion of the cover, corresponding to the extension, in a recess. In other words, after fixing the cover, the cover is retained on the orifice by its shape, that is to say its geometry.

The fixing may be final, that is to say that the cover cannot be removed from the orifice without being degraded, or temporary, that is to say that the cover retains its initial shape during removal and that it is possible to reuse said cover.

During the deformation step, the at least one extension is subjected to a force causing a deformation, which may be plastic or elastic force, of the at least one extension.

Said force is exerted along an elongation axis of the extension or transverse to it.

A point of application of said force is located at the extension of the cover.

The method according to the invention exerts a force only on the extension of the cover which is the point of application. Thus, the cover must have less important mechanical characteristics than in the state of the art. In this way, a large number of materials can be used to make the cover.

The method according to the invention makes it possible to produce the cover in a material which is not deformed in a hot and humid environment, that is to say that the material has good resistance to humidity and heat.

The method according to the invention finally allows, preserving a seal of the cover on the orifice longer than with a fixing method of the state of the art.

Furthermore, the method for fixing the cover according to the invention does not require the use of an additional connecting member, such as a screw for example. In this way, there are no longer any problems associated with a supply of self-shaping screws, or with a polarization in relation to other screws.

According to a first variant of the invention, the deformation step comprises an at least partial melting phase of the extension of the cover.

The fusion phase is carried out after the insertion step.

The melting phase causes a plastic deformation of the extension of the cover.

Indeed, the shape, or the geometry, of the cover is definitively modified by the melting phase.

After the melting phase, the extension has a head at one end. Said head has a section greater than a section of the recess so that the head cannot pass through the recess.

The melting phase creates a final fixing of the cover on the orifice.

According to a characteristic of the first variant of the invention, the deformation step comprises a positioning phase in which an anvil is placed in contact with an edge of a protective wall of the cover facing a first end of the at least one extension and in which a deforming element is placed substantially in contact with a second end of the at least one extension.

The anvil is a tool allowing to hold the first end of the extension in position while the second end is liquefied under the action of the deforming element.

The deforming element allows increasing an inner energy of the extension so as to melt it. For this, the deforming element comprises a heat or ultrasound source.

When the deforming element is moved away from the extension, the second end is solidified by forming a head.

In this way, the head is in contact with a wall of the orifice and there is no axial backlash, that is to say a spacing between the cover and the wall of the orifice along the elongation axis of the extension.

According to a second variant of the invention, the deformation step comprises a phase of bending the at least one extension, said phase being carried out before the insertion step.

The bending phase is performed before the insertion step.

The bending phase makes it possible to temporarily modify the shape of the cover, that is to say that it is an elastic deformation of the cover.

The bending phase allows an insertion of the extension into the recess.

After the bending phase, the insertion step is carried out.

When the extension is inserted into the recess, the extension returns to its original shape. The extension is then blocked in the recess.

The fixing of the cover on the orifice is temporary, that is to say that by again exerting a bending phase, the extension, and therefore the cover, can be removed from the recess.

The invention also relates to a cover intended to be fixed on an orifice of a power steering system by implementing the method according to the invention, said cover comprising a protective wall surrounded at least partially by an edge, and at least one extension which is irreversibly connected to the edge.

The protective wall is configured to cover a part or the entire of the orifice.

The term «irreversibly connected» means that the extension cannot be separated from the cover without degrading the latter. The extension and the cover form a single part.

Thus the extension does not correspond to an insert on the cover so as to fix the latter on an orifice.

According to a characteristic of the invention, the protective wall and the edge extend in the same plane.

According to a characteristic of the invention, the edge surrounds the protective wall.

According to a characteristic of the invention, the cover comprises a plurality of extensions.

According to a characteristic of the invention, the at least one extension extends substantially along an axis orthogonal to a plane in which the protective wall extends.

Thus the extension is adapted to be introduced into a recess positioned next to the orifice to be closed. The recess extends along an axis similar to an elongation axis of the orifice.

According to one characteristic, a face of the cover opposite to a face comprising at least one extension is substantially planar.

When the extension is inserted into the recess, the cover has no projecting elements.

According to a characteristic of the invention, the cover is made of a material from: poly(butylene terephthalate), or polypropylene.

The poly(butylene terephthalate) or PBT is a thermoplastic polymer belonging to the family of polyesters. This semi-crystalline polymer is obtained by polycondensation of terephthalic acid and butane-1,4-diol.

The polypropylene is a semi-crystalline thermoplastic polymer.

The poly(butylene terephthalate) and the polypropylene are two materials having good mechanical characteristics, high resistance to humidity and good temperature stability. Furthermore, these materials are thermofusible.

According to a characteristic of the invention, the at least one extension has a length greater than a length of a recess in which it is intended to be inserted.

Thus the extension is dimensioned to cross from side to side a through recess.

According to a characteristic of the invention, the at least one extension comprises two elements extending parallel to one another.

Thus during a bending phase, the two elements undergo a deformation. The deformation is less significant than if the extension is formed by a single element. In this way, two elements make it possible to avoid excessive deformation causing a risk of degradation.

According to a characteristic of the invention, one end of the at least one extension comprises a protrusion.

The protrusion is dimensioned so as to pass inside the recess. The protrusion is configured to be supported on an edge of the recess so as to block a withdrawal of the cover from the recess.

According to a characteristic of the invention, the protrusion comprises a relief angle, that is to say an angle formed between an axis transverse to the elongation axis of the extension and an edge of the protrusion.

According to a characteristic of the invention, the relief angle is comprised between 1° and 30°, and more precisely between 5° and 15°.

The relief angle makes it possible to make an assembly of the cover on the orifice without creating an axial backlash, that is to say a spacing between the cover and the wall of the orifice along the elongation axis of the extension, by overcoming the different dispersions and tolerances of the cover and the orifice of the power steering system.

According to a characteristic of the invention, the at least one extension comprises at least two legs connected to a free end of a rod.

The rod is substantially rectilinear.

A first end of the rod is fixed on the edge of the protective wall and the two tabs are fixed to a second end of the rod.

The two legs are substantially symmetrical and flexible.

The two legs form an acute angle.

The two legs allow greater deformation of the extension. In this way, it is possible to be easily adapted to large dispersions of dimensions of the recess.

The invention also relates to a steering housing of a power steering system of a motor vehicle, said housing comprising a cover according to the invention.

The invention will be better understood from the description below, which relates to several embodiments according to the present invention, given by way of non-limiting examples and explained with reference to the appended schematic drawings, in which.

The invention relates generally to a housing 1', 1" of a power steering system of a motor vehicle.

The housing 1', 1" includes an external wall 5', 5" which can be metallic or made of a rigid plastic material. It accommodates a gear mechanism not represented in the figures.

The mechanism is preferably a reducer comprising a reduction wheel and a worm screw which ensures a mechanical transmission between a steering assistance motor and a movable member, such as a rack or a steering column. The steering column allows changing the yaw orientation (steering angle) of the vehicle steered wheels.

The housing 1', 1" comprises several access orifices 2, 3, 4 which pass through the external wall 5', 5" of said housing 1', 1" to allow an introduction and an assembly of all or part of the housing 1', 1" elements. The orifices 2, 3, 4 have a substantially circular shape.

Thereafter, we will focus more particularly on the cover 6', 6" allowing to close the orifice 4 positioned on the reduction wheel.

Figure 1:
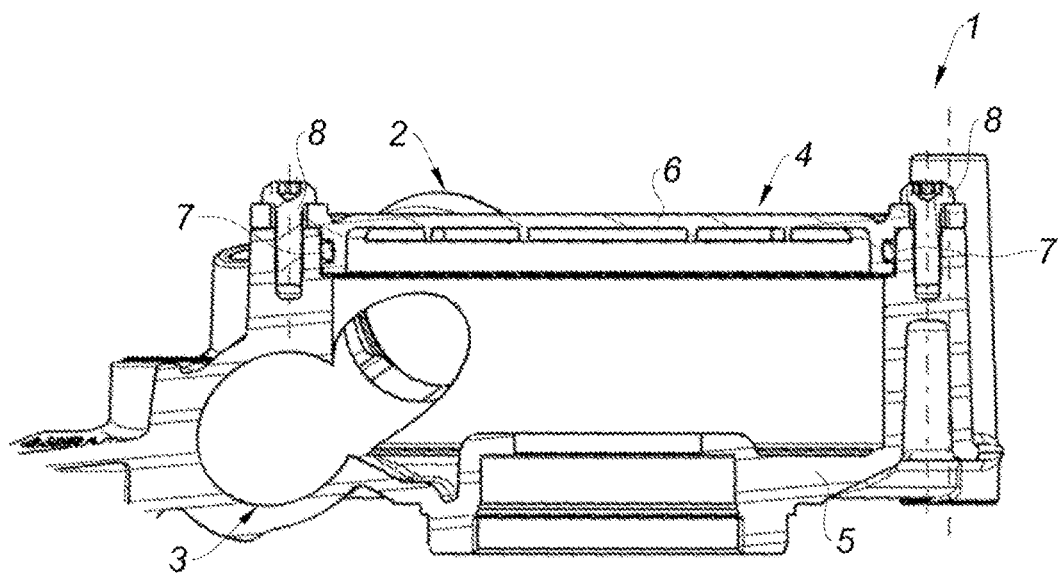
FIG. 1 is a representation of a housing of a power steering system according to the state of the art.
Figure 2:
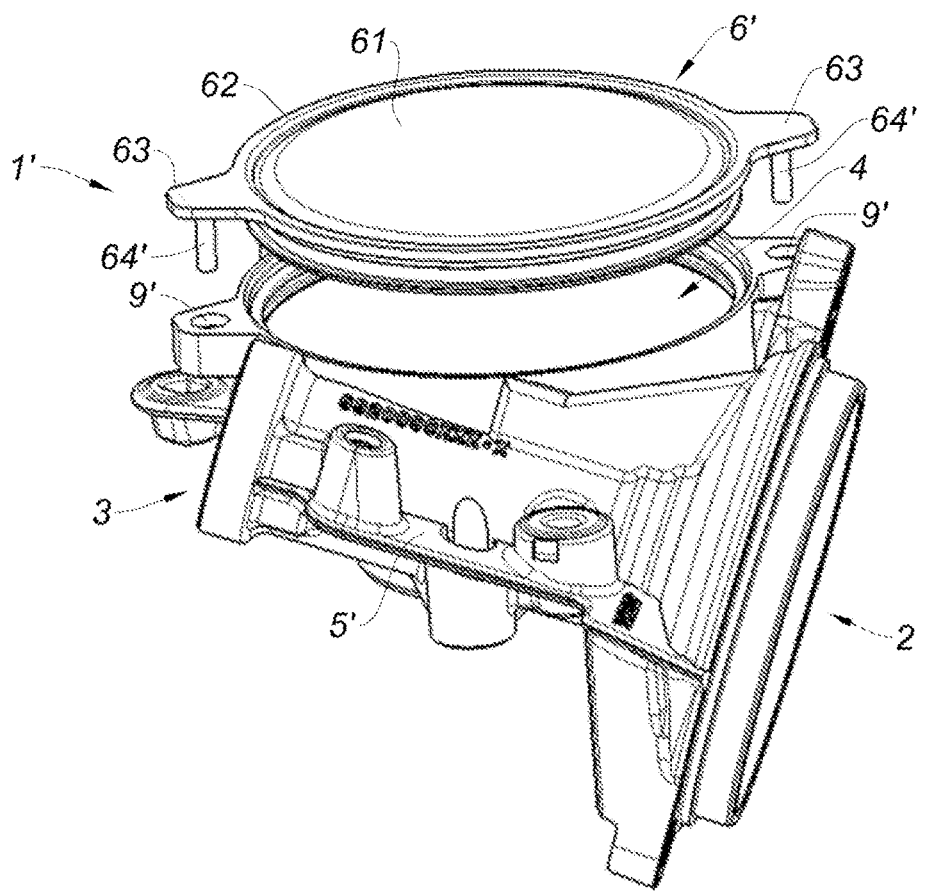
FIG. 2 is a perspective representation of a step of approaching a cover according to a first embodiment to an orifice of a housing of a steering system.
Figure 3:
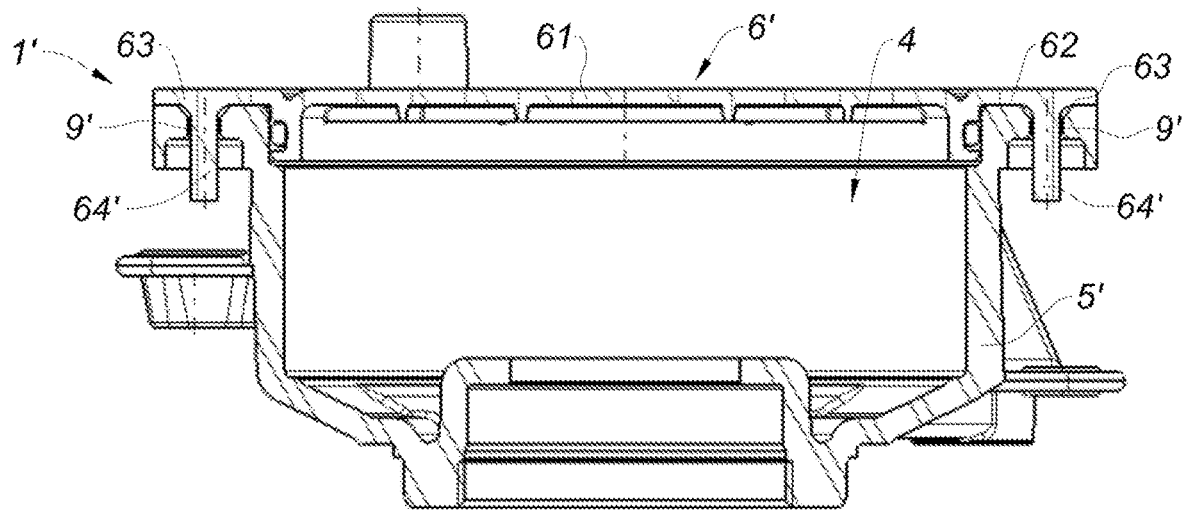
FIG. 3 is a sectional view of the housing of the steering system after carrying out a step of inserting the cover according to the first embodiment.
Figure 4:
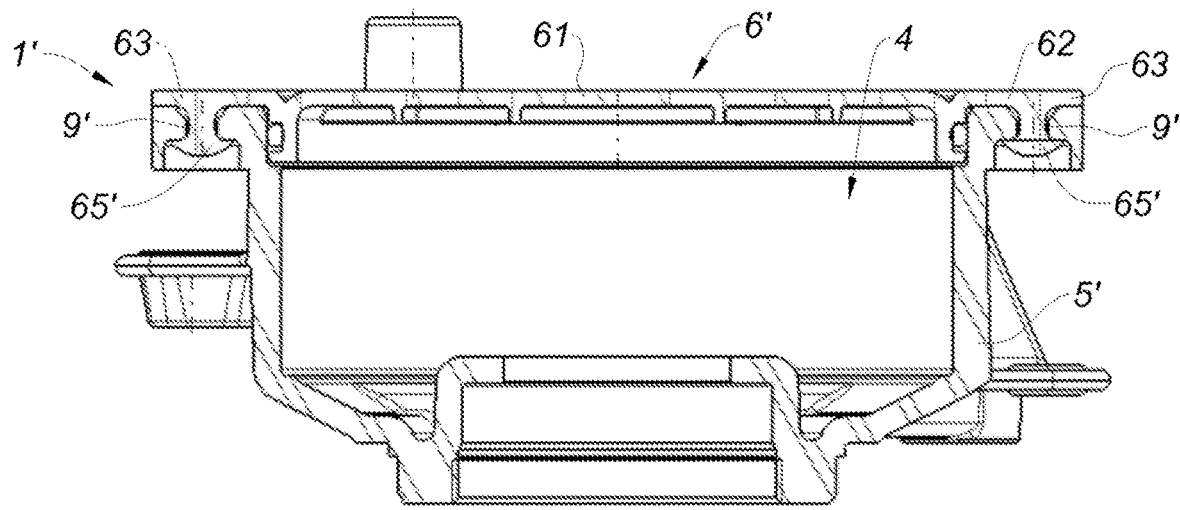
FIG. 4 is a sectional view of the housing of the steering system after carrying out a step of deforming the cover according to the first embodiment.

A first embodiment of the invention is illustrated more particularly by FIGS. 2, 3 and 4.

In this embodiment, the housing 1' comprises two recesses 9' of substantially circular section. They are positioned diametrically opposite next to the orifice 4. The recesses 9' are not combined with the orifice 4. The recesses 9' pass through a thickness of the external wall 5' of the housing 1'. They are therefore through-going recesses.

The cover 6' according to the first embodiment comprises a substantially circular protective wall 61 having a diameter substantially equal to the diameter of the orifice 4. The protective wall 61 is extended in a plane in which the protective wall extends 61 by an edge 62.

The edge 62 surrounds the protective wall 61 and comprises two portions 63 positioned diametrically opposite relative to the protective wall 61. Each portion 63 comprises an extension 64'.

The extension 64' is irreversibly fixed to the portion 63. More specifically, the cover 6', comprising the protective wall 61, the edge 62 and the extensions 64', is produced in a single material injection operation. The extension 64' has a substantially cylindrical shape having a diameter substantially equal to a diameter of the recess 9' into which it is intended to be inserted. The extension 64' extends along an axis orthogonal to the plane in which the protective wall 61 extends. The extension 64' has a length greater than the length of the recess 9' in which it is intended to be inserted.

The two extensions 64' are positioned on the same face of the cover 1', hereinafter called inner face. So that the two extensions 64' can be inserted into the corresponding recess 9'.

A method for fixing according to the invention the cover 6' on the orifice 4 comprises a step of approaching the cover 6' to the orifice 4 as represented in FIG. 2. In this step, the cover 6' is positioned away from the housing 1', facing the orifice 4. More precisely, the inner face of the cover 6' is positioned facing the orifice 4 so that the extensions 64' are each facing a recess 9'.

Then, a step of inserting the extensions 64' of the cover 6' into the recesses 9' is carried out. When the insertion step is complete, the protective wall 61 covers the orifice 4 and the edge 62 is in contact with the external wall 5' of the housing 1'.

Furthermore, each extension 64' is positioned in a recess 9' as represented in FIG. 3. Each extension 64' protrudes from the corresponding recess 9'.

The fixing method then comprises a step of deforming the extensions 64', and more precisely, a positioning phase and then a melting phase.

During the positioning phase, an anvil is placed in contact with the portion 63 of the cover 6'. Thus, the anvil is positioned on one face of the cover 1' opposite to the inner face.

Furthermore, a deforming element is positioned in contact with a free end of the extension 64', that is to say the end which has passed through the recess 9'.

During the melting phase, the deforming element on the one hand increases the inner energy of the extension 64' so as to make the extension 64' liquid, and on the other hand exerts pressure on the extension 64' towards the anvil so that the length of the extension 64' is reduced and that a head 65' is created at the extension 64'.

The head 65' has a substantially circular shape with a diameter greater than the diameter of the recess 9'. The head 65' is in contact with the outer wall 5' of the housing 1'.

After cooling, the head 65' hardens and can no longer pass through the recess 9'. Thus, the head 65' prevents a withdrawal of the extension 64' from the recess 9' and therefore a withdrawal of the cover 6' from the orifice 4.

The deformation step is carried out on the two extensions 64' simultaneously or on the contrary successively.

Figure 5:
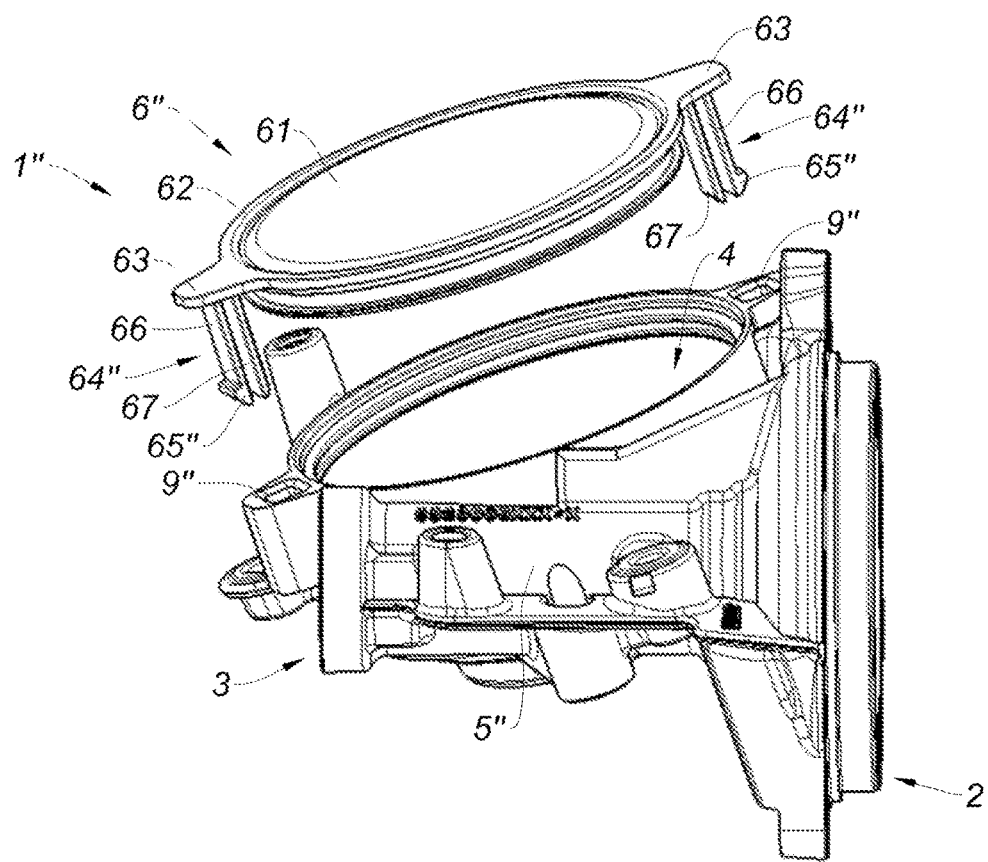
FIG. 5 is a perspective representation of a step of approaching a cover according to a second embodiment to an orifice of a housing of a steering system.
Figure 6:
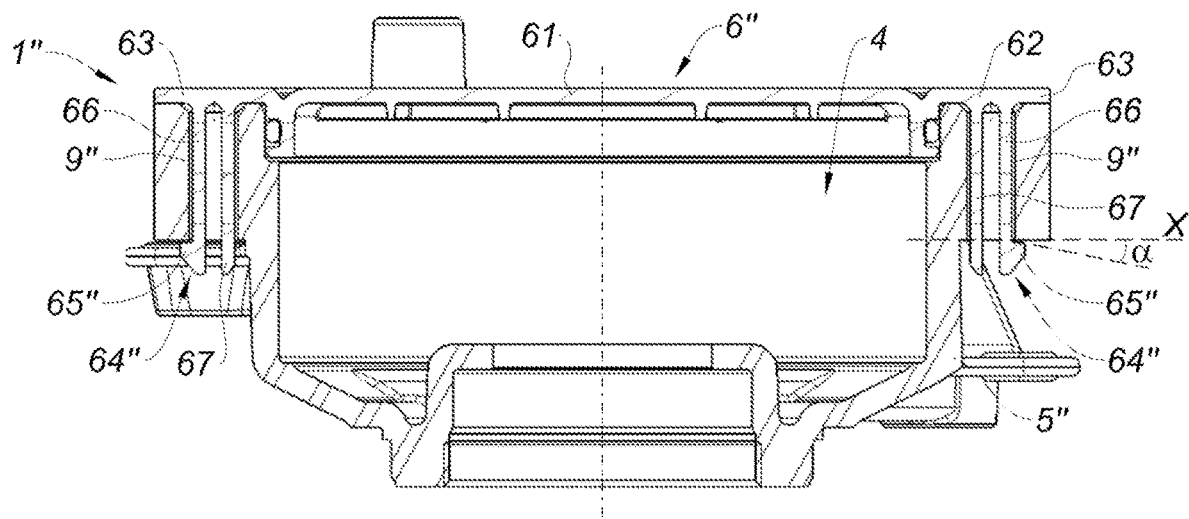
FIG. 6 is a sectional view of the housing of the steering system after carrying out a step of inserting the cover according to the second embodiment.

A second embodiment of the invention is illustrated more particularly by FIGS. 5 and 6.

In this embodiment, the housing 1" comprises two recesses 9''' of substantially square or circular section. They are positioned diametrically opposite next to the orifice 4. The recesses 9''' are not merged with the orifice 4. The recesses 9''' pass through a thickness of the outer wall 5" of the housing 1". They are therefore through-going recesses.

The cover 6" according to the second embodiment comprises a substantially circular protective wall 61 having a diameter substantially equal to the diameter of the orifice 4. The protective wall 61 is extended in a plane in which the protective wall 61 extends by an edge 62.

The edge 62 surrounds the protective wall 61 and comprises two portions 63 positioned diametrically opposite relative to the protective wall 61. Each portion 63 comprises an extension 64".

The extension 64" is irreversibly fixed to the portion 63. More specifically, the cover 6", comprising the protective wall 61, the edge 62 and the extensions 64", is made in a single injection material operation. The extension 64" extends along an axis orthogonal to the plane in which the protective wall 61 extends. The extension 64" has a length slightly greater than the length of the recess 9" in which it is intended to be inserted. The extension 64" comprises a first element 67 and a second element 66 extending parallel to each other. The first element 67 has a smooth surface. The second element 66 comprises, at a free end, that is to say the end opposite an end in contact with the edge 62, a protrusion 65".

The protrusion 65" comprises a relief angle α, that is to say an angle formed between an axis X transverse to the elongation axis of the extension and an edge of the protrusion 65". The relief angle α is comprised between 5° and 15°.

The two extensions 64" are positioned on the same face of the cover 1", hereinafter called the inner face. So that the two extensions 64" can be inserted in the corresponding recess 9".

A method for fixing according to the invention the cover 6" on the orifice 4 comprises a step of approaching the cover 6" to the orifice 4 as represented in FIG. 5. In this step, the cover 6" is positioned away from the housing 1", facing the orifice 4. More precisely, the inner face of the cover 6" is positioned facing the orifice 4 so that the extensions 64" are each facing a recess 9".

Then a step of deforming the extensions 64" is carried out and more precisely a bending phase. In said bending phase, the two elements 66, 67 of each extension 64" are elastically brought together. To carry out this bending step, a force is exerted on the two elements 66, 67 of each extension 64". The deformation step is simultaneously carried out on the two extensions 64".

After the deformation step, a step of inserting the extensions 64" of the cover 6" in the recesses 9" is carried out. When the insertion step is complete, the protective wall 61 covers the orifice 4 and the edge 62 is in contact with the outer wall 5" of the housing 1". Furthermore, each extension 64" is positioned in a recess 9" as represented in FIG. 6. Each extension 64" protrudes from the corresponding recess 9".

No force is being exerted on the two elements 66, 67, these come in a holding position. The protrusion 65" of the second element 66 comes into contact with the external wall 5" of the housing 1". The relief angle α making it possible to make an assembly of the cover on the orifice without creating an axial backlash, that is to say a spacing between the cover and the wall of the orifice along the elongation axis of the extension.

The protrusion 65" is not positioned in an axis of the recess 9". It is offset relative to said axis of the recess 9". Thus, the protrusion 65" can no longer pass into the recess 9". The protrusion 65" prevents a withdrawal of the extension 64" from the recess 9" and therefore a withdrawal of the cover 6" from the orifice 4.

Figure 7:
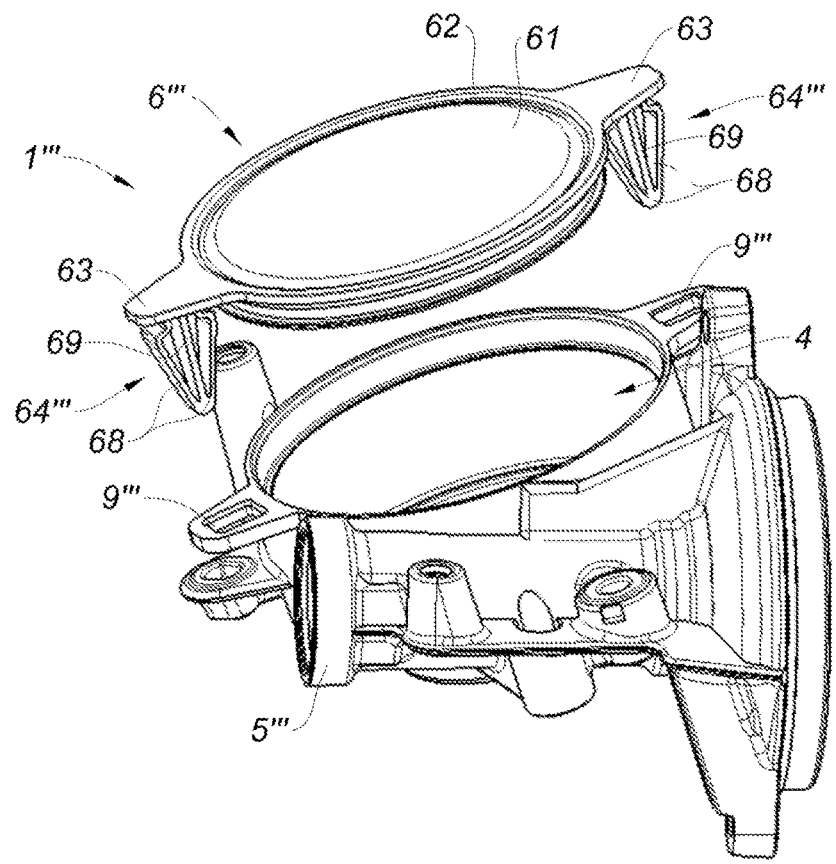
FIG. 7 is a perspective representation of a step of approaching a cover according to a third embodiment to an orifice of a housing of a steering system.
Figure 8:
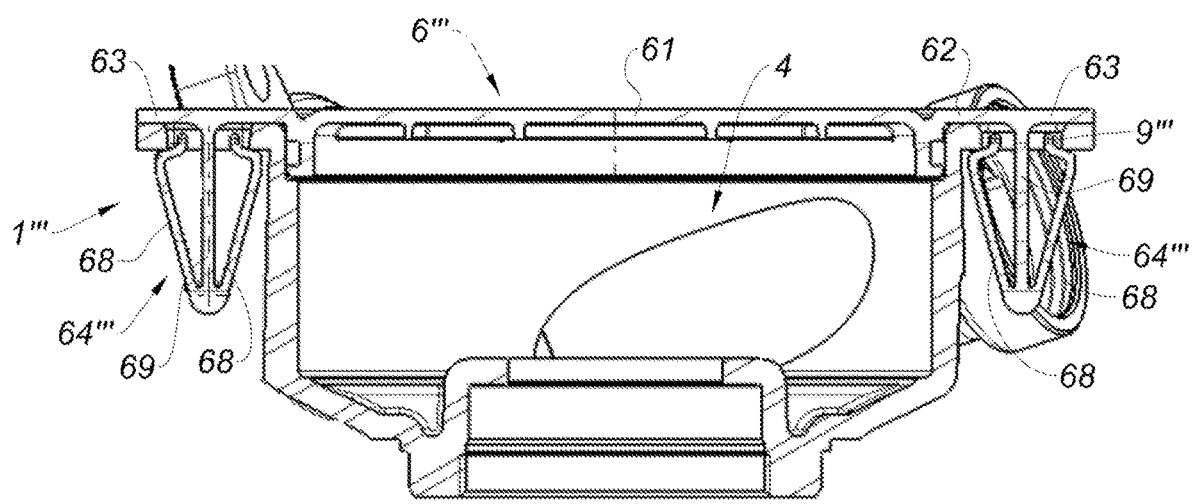
FIG. 8 is a sectional view of the housing of the steering system after carrying out a step of inserting the cover according to the third embodiment.

A third embodiment of the invention is illustrated more particularly by FIGS. 7 and 8.

In this embodiment, the housing 1''' comprises two recesses 9''' of a substantially rectangular section. They are positioned diametrically opposite next to the orifice 4. The recesses 9''' are not merged with the orifice 4. The recesses 9''' pass through a thickness of the external wall 5''' of the housing 1'''. They are therefore through-going recesses.

The cover 6''' according to the third embodiment comprises a substantially circular protective wall 61 having a diameter substantially equal to the diameter of the orifice 4. The protective wall 61 is extended in a plane in which the protective wall 61 extends by an edge 62.

The edge 62 surrounds the protective wall 61 and comprises two portions 63 positioned diametrically opposite relative to the protective wall 61. Each portion 63 comprises an extension 64'''.

The extension 64''' is irreversibly fixed to the portion 63. More specifically, the cover 6''', comprising the protective wall 61, the edge 62 and the extensions 64''', is produced in a single material injection operation. The extension 64''' extends along an axis orthogonal to the plane in which the protective wall 61 extends. The extension 64''' has a length greater than the length of the recess 9''' in which it is intended to be inserted. The extension 64''' comprises two legs 68 connected to a free end of a rod 69.

The rod 69 is substantially rectilinear. A first end of the rod is fixed to the edge 62 of the protective wall 61 and the two legs 68 are fixed to a second end of the rod 69.

The two legs 68 are substantially symmetrical and flexible. The two legs 68 extend on either side of the rod 69. The legs 668 form an acute angle with the rod 69.

The two extensions 64''' are positioned on the same face of the cover 1''', hereafter called the inner face. So that the two extensions 64''' can be inserted into the corresponding recess 9'''.

A method for fixing according to the invention the cover 6''' on the orifice 4 comprises a step of approaching the cover 6''' to the orifice 4 as represented in FIG. 7.

In this step, the cover 6''' is positioned at a distance from the housing 1''', facing the orifice 4. More precisely, the inner face of the cover 6''' is positioned facing the orifice 4 so that the extensions 64''' are each facing a recess 9'''.

Then a step of deforming the extensions 64''' is carried out and more precisely a bending phase. In said bending phase, the two legs 68 of each extension 64''' are elastically brought together and are brought closer to the rod 69. To carry out this bending step, a force is exerted on the two legs 68 of each extension 64'''. The deformation step is simultaneously carried out on the two extensions 64'''.

After the deformation step, a step of inserting the extensions 64''' of the cover 6''' is carried out in the recesses 9'''. When the insertion step is complete, the protective wall 61 covers the orifice 4 and the edge 62 is in contact with the outer wall 5''' of the housing 1'''. Furthermore, each extension 64''' is positioned in a recess 9''' as represented in FIG. 8. Each extension 64''' protrudes from the corresponding recess 9'''.

No force is being exerted on the two legs 68, these come in a holding position and prevent a withdrawal of the extension 64''' from the recess 9''' and therefore a withdrawal of the cover 6''' from the orifice 4.

Of course, the invention is not limited to the embodiments described and represented in the appended figures. Modifications remain possible, in particular from the point of view of the constitution of the various elements or by substitution of technical equivalents, without thereby departing from the scope of protection of the invention.

The invention claimed is:

1. A method for fixing a cover on an orifice of a power steering system comprising:
    a step of approaching the cover to the orifice;
    a step of inserting at least one extension of the cover in at least one recess positioned next to the orifice; and
    a step of deforming the at least one extension of the cover, wherein
    the deformation step further includes an at least partial melting phase of the at least one extension of the cover.
2. The method according to claim 1, wherein the deformation step further includes a positioning phase in which an anvil is placed in contact with an edge of a protective wall of the cover facing a first end of the at least one extension and a deforming element is placed in contact with a second end of the at least one extension.

3. The method according to claim 1, wherein the deformation step further includes a bending phase of the at least one extension, the bending phase being carried out before the insertion step.

4. A cover configured to be fixed to an orifice of a power steering system by implementing the method according to claim 1, the cover comprising:
   a protective wall at least partially surrounded by an edge, the at least one extension being irreversibly connected to the edge.

5. The cover according to claim 4, wherein the at least one extension extends along an orthogonal axis to a plane along which the protective wall extends.

6. The cover according to claim 4, wherein the cover is made of a material from: poly(butylene terephthalate), or polypropylene.

7. The cover according to claim 4, wherein the at least one extension has a length greater than a length of the at least one recess into which the at least one extension is configured to be inserted.

8. The cover according to claim 4, wherein the at least one extension includes two elements extending parallel to one another.

9. The cover according to claim 4, wherein one end of the at least one extension includes a protrusion.

10. The cover according to claim 4, wherein the at least one extension includes at least two legs connected to a free end of a rod.

* * * * *